United States Patent [19]

McCoy

[11] Patent Number: 4,465,602

[45] Date of Patent: Aug. 14, 1984

[54] OIL RECOVERY METHOD UTILIZING AN ALKYLARYLPOLYALKOXYALKYLENE SULFONATE

[75] Inventor: David R. McCoy, Austin, Tex.

[73] Assignee: Texaco Inc., White Plains, N.Y.

[21] Appl. No.: 387,711

[22] Filed: Jun. 11, 1982

[51] Int. Cl.$^3$ .............................................. E21B 43/22
[52] U.S. Cl. ............................ 252/8.55 D; 166/273; 166/274; 166/275
[58] Field of Search ................................ 252/8.55 D; 166/273-275

[56] References Cited

U.S. PATENT DOCUMENTS

| | | | |
|---|---|---|---|
| 3,456,732 | 7/1969 | Stratton | 166/274 |
| 3,977,471 | 8/1976 | Gale et al. | 252/8.55 D |
| 4,077,471 | 3/1978 | Shupe et al. | 252/8.55 D |
| 4,157,115 | 6/1979 | Kalfoglou | 252/8.55 D |
| 4,187,073 | 2/1980 | Schievelbein | 252/8.55 D |
| 4,220,204 | 9/1980 | Hughes et al. | 252/8.55 D |
| 4,237,018 | 12/1980 | Schievelbein | 252/8.55 D |
| 4,269,271 | 5/1981 | Shupe et al. | 252/8.55 D |
| 4,293,428 | 10/1981 | Gale et al. | 252/8.55 D |
| 4,318,816 | 3/1982 | Schievelbein | 252/8.55 D |
| 4,331,543 | 5/1982 | Wilson et al. | 252/8.55 D |

Primary Examiner—Christine M. Nucker
Attorney, Agent, or Firm—Robert A. Kulason; Jack H. Park; Richard A. Morgan

[57] ABSTRACT

An alkylarylpolyalkoxyalkylene sulfonate alone or combined with a water soluble petroleum sulfonate surfactant is dissolved in water to form an effective surfactant fluid that is stable in high salinity environments. The surfactant fluid is injected into an underground petroleum-containing reservoir in an enhanced oil recovery process.

18 Claims, No Drawings

OIL RECOVERY METHOD UTILIZING AN ALKYLARYLPOLYALKOXYALKYLENE SULFONATE

BACKGROUND OF THE INVENTION

1. Field of the Invention

This invention relates to a process for recovering petroleum from subterranean formations by aqueous surfactant flooding using an alkylarylpolyalkoxyalkylene sulfonate containing fluid. In another embodiment, the invention relates to a petroleum recovery fluid comprising petroleum sulfonates and a solubilizing amount of an alkylarylpolyalkoxyalkylene sulfonate in aqueous medium.

2. Description of the Prior Art

Crude oil which has accumulated in subterranean reservoirs is recovered or produced through one or more wells drilled into the reservoir. In the initial production, the crude oil is produced by primary recovery techniques wherein only the natural forces present in the reservoir are utilized to produce the oil. However, upon depletion of these natural forces and the termination of primary recovery a large portion of the crude oil remains trapped within the reservoir. Additionally, many reservoirs lack sufficient natural forces to be produced by primary methods from the very beginning. Recognition of these facts has led to the development and use of many enhanced oil recovery techniques. Most of these techniques involve injection of at least one fluid into the reservoir to produce an additional amount of crude oil. Some of the more common methods are water flooding, steam flooding, $CO_2$ flooding, polymer flooding, surfactant flooding, caustic flooding, and in situ combustion.

Water flooding, which involves injection of water into the subterranean oil reservoir for the purpose of displacing the crude oil from the pore spaces of the reservoir rock toward the producing wells, is the most economical and widely used of the enhanced oil recovery methods. Nevertheless, water does not displace oil with high efficiency because of the immiscibility of water and oil and because of the high interfacial tension between them.

Surfactant flooding involves the addition of one or more surface active agents or surfactants to the water flood for the purpose of minimizing the water flooding problems mentioned above. This has been an area of active interest in the art of enhanced oil recovery methods for many years. U.S. Pat. No. 3,302,713 discloses the use of petroleum sulfonates as effective surfactants in oil recovery operations. Other surfactants proposed for use in oil recovery processes include alkyl sulfates, alkyl aryl sulfates, alkyl or alkyl aryl ethoxy sulfates, alkyl sulfonates, alkyl aryl sulfonates, and quaternary ammonium salts.

While the above surfactants may be effective under ideal conditions, there are problems concerned with the use of each in most petroleum reservoirs. Some of the most serious problems arise from the effects of reservoir fluid salinity on the injected surfactant solution, the most common being precipitation and resultant loss of the surfactant. The petroleum sulfonates represent a class of surfactants that are relatively inexpensive and that are quite effective oil recovery agents under certain conditions. However, when used in single surfactant systems, they are best employed in reservoirs having brines of 10,000 ppm or less total dissolved solids salinity and a very low divalent ion concentration. Effectiveness of a petroleum sulfonate surfactant system can be extended somewhat by blending oil soluble petroleum sulfonates with water soluble petroleum sulfonates. However, even a solution such as this is not entirely satisfactory because as the blended mixture is driven through the formation one of the components is often preferentially retained within the formation matrices, causing a change in the relative concentration of the surfactant components and resulting in a failure to maintain effective salinity tolerance as evidenced by precipitation of the surfactants.

It can be readily seen that there remains a substantial need for a surfactant flooding process that will allow the use of petroleum sulfonates in high salinity and high divalent ion concentration reservoir environments.

U.S. Pat. No. 4,220,204, Hughes et al., and U.S. Pat. No. 4,318,816, Schievelbein describe related processes to that disclosed in the present application.

SUMMARY OF THE INVENTION

This invention concerns a surfactant water flood enhanced oil recovery process suitable for use in high salinity, high temperature environments. The process involves recovering petroleum from a subterranean petroleum-bearing formation penetrated by an injection well and a production well. The process comprises:

(A) injecting into the formation via the injection well a drive fluid comprising water having dissolved therein an effective amount of a surface active agent having the general formula:

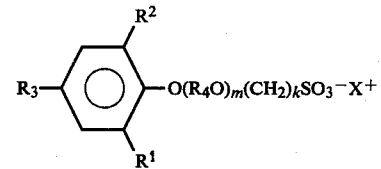

wherein
- $R_1$ is a radical selected from the group, consisting of ethyl, propyl, 1-butyl, 2-butyl, isopropyl, isobutyl and t-butyl,
- $R_2$ is hydrogen or $R_1$,
- $R_3$ is a branched or linear alkyl radical containing from 5 to 30 carbon atoms,
- $R_4$ is an ethylene or 1,2-propylene radical,
- m is an integer of from 2 to 20,
- k is an integer of from 2 to 4 and
- X is a sodium, potassium or ammonium cation;

(B) forcing the fluid through the formation and (C) recovering petroleum through the production well.

DESCRIPTION OF THE PREFERRED EMBODIMENTS

This invention concerns a surfactant water flooding oil recovery process, especially one suitable for use in formations containing high salinity water, e.g., water whose salinity is in excess of 50,000 parts per million total dissolved solids, and which formation temperatures exceed about 150° F. In low temperature, low salinity water-containing oil formations, less expensive surfactants such as water soluble petroleum sulfonates may be employed satisfactorily. When the salinity exceeds 50,000 parts per million, petroleum sulfonates are unsatisfactory and other types of surfactants must be used. Nonionic surfactants as well as sulfated and ethoxylated surfactants may be employed in high salinity formations so long as the temperature does not exceed 150° F. At higher temperatures, the nonionic surfactants become insoluble and the sulfated and ethoxylated surfactants hydrolyze so quickly that they cannot be used under these conditions. Accordingly, under the high temperature, high salinity conditions described above, the surfactant must be a sulfonated and ethoxylated surfactant.

Ordinarily, surfactant water flooding is applied to formations which have already been depleted as far as is economically feasible by primary recovery, and in most instances, the formation will also have been water flooded to an economical limit. Although not essential, this is the common practice followed today in exploiting oil containing formations. Ordinarily, enhanced oil recovery operations make use of a plurality of injection wells and production wells specially arranged in patterns such as five spot patterns, which comprise injection wells on the corners of a square grid with a production well located at or near the center. Variations of this basic five spot pattern are well known, but in all patterns employed in enhanced recovery processes, there will be a determinable recovery zone within each unit of the pattern in which the pore volume of that unit is determinably based on the well spacing, formation thickness, sweep efficiency of the pattern employed, and formation porosity. The volume of surfactant solution and other fluids employed is then conveniently expressed in terms of a fraction or multiple of the pore volume determined for each pattern.

In applying aqueous surfactant flooding enhanced oil recovery procedures to subterranean formations which have been previously exploited by primary and secondary recovery, it is common in practicing state-of-the-art enhanced recovery techniques to inject other fluids into the formation prior to or subsequent to the injection of the surfactant fluid, and it is contemplated that such fluids may be employed in connection with the process of this invention. The injection of water of a different salinity than is present in the formation at the time enhanced recovery operations are begun in order to alter the salinity of the water present in the formation is frequently used and may be used in connection with the process of this invention. The preferred method of operating in the procedure of this invention, however involves adjusting the surfactant solution to provide optimum performance at the salinity existing in the formation rather than attempting to vary the salinity of the formation to fit the requirements of the surfactant solution. Other fluids injected into the formation prior to injection of the surfactant solution for accomplishing other purposes are also known in the art and may be employed in connection with this invention. Such pretreatment processes include injection of aqueous solutions of sacrificial agents which are absorbed by the formation rock matrix and therefore cause a reduction in the tendency for the formation to absorb surfactant from the subsequently injected surfactant solution. Although many inorganic salts have been described in the literature for use as sacrificial agents, such as sodium carbonate, in applying the process of this invention to formations containing high salinity water which commonly also contain relatively high concentrations of divalent ions such as calcium or magnesium which form insoluble precipitates with most sacrificial inorganic salts, other sacrificial agents may be necessary to prevent absorption of surfactant. Lignosulfonates as well as certain modified lignosulfonates have been described in the literature and are suitable for use in connection with this invention for this purpose.

Another step commonly practiced in state-of-the-art enhanced oil recovery procedures involves injection of an aqueous fluid into the formation subsequent to injection of the surfactant solution for the purpose of improving the displacement efficiency of the enhanced oil recovery process. The fluid injected after the surfactant fluid must exhibit fluid mobility in the petroleum-bearing formation less than the mobility of the previously injected fluids and less than the mobility of petroleum in order to improve the sweep efficiency of the process. Hydrophilic polymers such as polyacrylamide or polysaccharide are commonly employed in the industry for this purpose. Such polymers are expensive and frequently produce undesirable reactions with the surfactant fluids injected. In certain preferred embodiments of the process of the present invention, the inclusion of an amount of hydrocarbon within the critical concentration range as described herein in the surfactant fluid not only reduces separation tendencies and improves the stability of the fluid, it also produces an unexpectedly significant increase in the viscosity of the surfactant fluid. In such instances, the use of the polymer fluid may not be necessary when the preferred embodiments of the process of the present invention are employed.

The surfactant fluid injected into the formation in practicing the process of this invention is a drive fluid comprising water having dissolved therein an effective amount of a surface active agent which is an alkoxylated and sulfonated surfactant having the general formula:

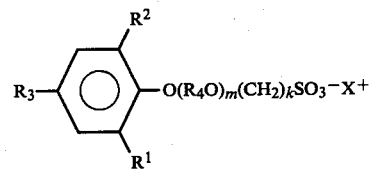

wherein
  $R_1$ is a radical selected from the group consisting of ethyl, propyl, 1-butyl, 2-butyl, isopropyl, isobutyl and t-butyl; preferably t-butyl;
  $R_2$ is hydrogen or $R_1$ and preferably $R_1$,
  $R_3$ is a branched or linear alkyl radical, containing from 5 to 30 carbon atoms,
  $R_4$ is an ethylene or 1,2-propylene radical,
  m is an integer of from 2 to 20,
  k is an integer of from 2 to 4 and preferably 2 to 3, and
  X is a sodium, potassium or ammonium cation.

In a preferred embodiment, $R_3$ is an oligomer of propylene or butylene, i.e., a polymer of 2, 3 or 4 monomer units. Sodium is a preferred choice of X, particularly when the drive fluid is formulated with and thereby contains brine.

In another preferred embodiment of the invention, the above described alkylarylpolyalkoxyalkylene sulfonate is used as substantially the only surfactant present in the surfactant fluid injected into the formation. In this single surfactant embodiment the concentration of the surfactant is from 0.5 to 10 and preferably from 1 to 5% by weight.

In another embodiment of the process of the invention, the aqueous fluid also contains petroleum sulfonate or other less expensive organic sulfonates. It is preferred that the petroleum sulfonate be at least partially water soluble with an average equivalent weight in a range of from about 350 to 500. The concentration of petroleum sulfonate will be from 0.5 to 10% and preferably 1.5 to 5% by weight and in this instance the akylarylpolyalkoxyalkylene sulfonate is used as a solubilizing cosurfactant, and the concentration is from 0.1 to 5% and preferably 0.5 to 3% by weight.

The water which makes up the aqueous medium of the fluid mixture of the present invention may be either hard or soft. The invention has been found to be particularly useful in hard water such as brine which contains large amounts of divalent ions. That is, the invention is especially effective for stabilizing aqueous surfactant solutions in which the aqueous medium contains large amounts of calcium and/or magnesium ions and is considered hard water. It is in these hard waters that some surfactants are particularly prone to be unstable. It is known in the art that surfactants such as petroleum sulfonates are not at all compatible with calcium and magnesium ions in hard water. Recent discoveries have shown that the sulfonates of alkylene oxide adducts of substituted phenols are compatible with calcium and mangesium ions in hard water or brine but their stability, that is their ability to remain in solution under all conditions of temperature and water hardness and salinity, is at times a problem. Therefore, the invention while including all types of water is particularly directed to hard water brines. Hard water may be defined as an aqueous solution containing from 100–20,000 parts per million polyvalent metal ions such as calcium and/or magnesium ions. Brines contain a minor amount to 25% by weight sodium chloride and may contain various amounts of other dissolved salts such as sodium bicarbonate, sodium sulfate, and sodium borate. The invention is operable in hard water, brines or hard water brines.

The water may also contain dissolved nitrogen, hydrogen sulfide, carbon dioxide, methane or other gases.

The various materials available under the general name of petroleum sulfonates vary in composition according to the petroleum fraction used for sulfonation and in the degree of sulfonation imparted to the petroleum fraction. Preferrable petroleum sulfonates are those prepared from a petroleum fraction whose boiling range is from 700° F. to 1100° F. which corresponds to a molecular weight range of from about 350 to about 500. The sodium salt of the sulfonated product of the petroleum fraction is an excellent material for use in the present invention. The potassium and ammonium salts are also useful.

Mixtures of petroleum sulfonates can also be employed as the sulfonate component of this invention. For example, a mixture of predominantly water soluble petroleum sulfonate having an average equivalent weight of less than 400 and preferably less than 350 may be utilized along with a second petroleum sulfonate which is at least partially oil soluble and having an average equivalent weight of about 400 to about 600 and preferably about 450 to about 550.

It has been found that the degree of solubility of the surfactant composition in the field water is extremely critical to the oil recovery efficiency in the process. If the surfactant is much more soluble in water than oil, then the surfactant tends to be distributed throughout the bulk of the water phase including both formation water and injected drive water, and little effectiveness will be achieved at the interfacial zones between oil and water. Similarly, if the surfactant is substantially more soluble in oil than it is in water, the surfactant will partition into and distribute itself throughout the oil phase, and will have little effect on the surface tension existing at the interfacial zone between oil and water. The optimum surfactant effectiveness is achieved if there is a condition of borderline solubility of the surfactant fluid in the drive water and/or formation water, so the surfactants tend to exist in higher concentrations at the interfacial zone between oil and water than in either the oil phase or the water phase.

It has been found that when using blends of petroleum sulfonates and the alkylarylpolyalkoxyalkylene sulfonate of the present invention, optimum oil recovery efficiency occurs when the concentrations of the materials are carefully balanced so as to produce a condition of borderline solubility. If too little solubilizing cosurfactant is used, the primary surfactants are rendered insoluble and at least a portion thereof will precipitate in the aqueous fluid. This can, as discussed above, result in at least reducing the effectiveness of the surfactant fluid for the purpose of recovering oil, and may lead to permanent, irreversible damage to permeability of the formation matrix, which will prevent any further displacement of petroleum from the formation. On the other hand, if more than the minimum amount of solubilizing alkylarylpolyalkoxyalkylene sulfonate which achieves the conditions which we have described above as borderline solubility is used in combination with petroleum sulfonate, the surfactants are rendered too soluble in the aqueous phase and the amount of oil displaced by such a fluid being injected into a formation is reduced. Moreover, since the cost of the alkylarylpolyalkoxyalkylene sulfonate is high compared to that of petroleum sulfonate, the result of using too much solubilizing alkylarylpolyalkoxyalkylene sulfonate is to increase the fluid cost and decrease the amount of oil recovered by the use of the fluid with rapidly diminishing economic attractiveness of the process.

The amount of solubilizing alkylarylpolyalkoxyalkylene sulfonate to achieve the above described desired condition of borderline solubility is highly dependent on all of the possible variations in the structural characteristics of the surfactant molecules employed. The average equivalent weight of the petroleum sulfonate, for example, will affect the amount of alkylarylpolyalkyoxyalkylene sulfonate required to achieve the condition of borderline solubility. For example, any change in the length of the alkyl chain which comprises the hydrophobe of the surfactant molecule, or a change in the number of alkylene oxide groups condensed with the molecule, will change the amount of alkylarylpolyalkoxyalkylene sulfonate cosurfactant needed to achieve the condition of borderline solubility with whatever primary anionic surfactant or mixture thereof it is used. Furthermore, the aqueous fluid salinity and the concentration of divalent ions present in the fluid will also vary the amount of the surfactants needed to achieve borderline solubility. Generally, higher salinity and/or higher concentrations of divalent ions of the aqueous fluid in which the surfactants are dissolved require increasing number of alkylene oxide units to be present on the solubilizing cosurfactant molecule.

It has been found that one satisfactory method for determining the proper concentrations of petroleum sulfonate and alkylarylpolyalkoxyalkylene sulfonate is found in U.S. Pat. No. 4,066,124 which is incorporated herein in its entirety by reference. By this method it has been found that brine solutions of about 0.1 wt % to about 5 wt. % of the alkylarylpolyalkoxyalkylene sulfonate of the present invention and about 0.5 wt% to about 10 wt. % of a petroleum sulfonate herein defined produce advantageous results in an enhanced oil recovery process. These advantageous results include applications where hydrolytically and thermally stable surface active agents are soluble in salt solutions containing divalent cations are required. Advantageous results are also achieved where relatively viscous solutions or emulsions are desired.

One unexpected advantage of the alkylarylpolyalkoxyalkylene sulfonate of the present invention is the surprising stability and viscosity displayed by some of the compounds over a wide range of salinities and temperatures. Another surprising result was obtained during the preparation of these compounds, as shown in Example I by addition of HOCH$_2$CH$_2$SO$_3$Na to the corresponding nonionic in the presence of KOH at 180° C. In marked contrast to the behavior of monoalkylphenol ethoxylates under these conditions, no decomposition of starting material to a substituted phenol was observed. Such decomposition is detrimental in that undesirable side products are formed, lowering product yields and requiring increased catalyst levels if nonionics are further recycled in the process scheme.

The surfactant used in the process and solution of the present invention is distinguished from the prior art by the presence of C$_2$, C$_3$ and C$_4$ alkyl groups at the 2- and optionally 6-position of the phenolic moiety.

This invention is more fully illustrated by the following Examples.

EXAMPLE I

A 1-liter resin flask equipped with thermometer, mechanical stirrer, vacuum takeoff and liquid metering tube was charged with 425 g. of the 10.1 molar ethoxylate of 4-dodecyl-2,6-di-t-butylphenol and 3.8 g KOH catalyst dissolved in 4 g H$_2$O. The mixture was heated with stirring under vacuum and 188 grams of a solution containing 56 wt. % HOCH$_2$CH$_2$SO$_3$Na in water was metered in over a 104 minute period while maintaining pressure at approximately 35 mm Hg and temperature at 180° C. in the presence of a nitrogen stream (about 16 cc/sec) to aid in water removal.

After addition was complete, the mixture was maintained with good stirring at the same temperature, pressure, and nitrogen flow for a period of 80 minutes and then cooled. The crude reaction product was taken up in 1000 g H$_2$O and extracted four times with a total of 5000 g ethyl acetate to remove unreacted nonionics and other water insoluble compounds. The aqueous layer was distilled to remove all ethyl acetate present and some water. Obtained was 1058 g of a solution containing (by antagonistic titration with a cationic surfactant) 24.8 wt. % of the polyethoxy sulfonate whose structure was:

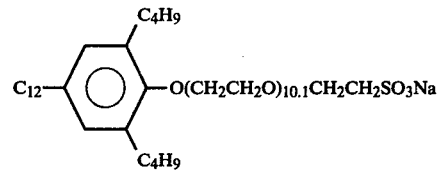

The ethyl acetate extracts from this process were distilled to remove solvent, leaving 106.6 g organic residue shown by high performance liquid chromatography on a gel permeation column to contain no 4-dodecyl-2,6-di-t-butylphenol. By contrast, when ethoxylates of dodecylphenol or nonylphenol were subjected to identical reaction conditions, the recovered organics from ethyl acetate extraction contained routinely from 3% to 7% dodecyl- or nonyl-phenol.

EXAMPLE II

The compound was synthesized by the general method of Example I, using 366 grams of a 5.3 molar ethoxylate of 4-dodecyl-2-t-butylphenol, 3 g KOH, 232 HOCH$_2$CH$_2$SO$_3$Na solution, and 155 minutes digestion time. Obtained, after ethyl acetate extraction, was 770 g of solution containing 22.2 wt % of the compound of structure:

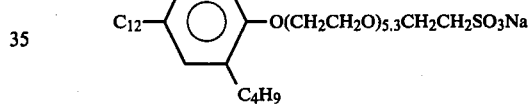

EXAMPLE III

The compound was synthesized by the general method of Example I, using 602 g of a 6.7 molar ethoxylate of 4-dodecyl-2,6-di-t-butylphenol, 1 g KOH, 260 g HOCH$_2$CH$_2$SO$_3$Na solution, and a digestion period of 215 minutes. After ethyl acetate extraction, 1143 g of aqueous solution was obtained which contained 27.5 wt. % of the compound of composition:

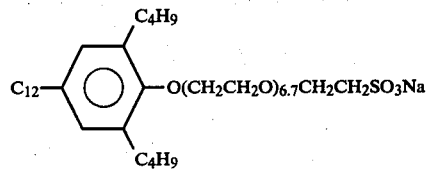

EXAMPLE IV

The compound was synthesized by the general method of Example I, using 469 g of a 10.1 molar ethoxylate of 4-dodecyl-2-t-butylphenol, 1 g KOH, 203 g HOCH$_2$CH$_2$SO$_3$Na solution, and a digestion period of 240 minutes. Extraction of aqueous solution with ethyl acetate left a solution weighing 898 g and containing 30.7 wt. % of the compound with composition:

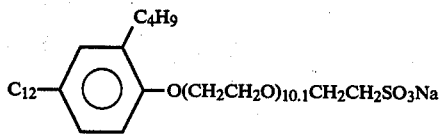

EXAMPLE V

In the field in which primary production has already been exhausted, an injection well is completed in the hydrocarbon-bearing formation and perforations are formed between the interval of 6890–6910 feet. A production well is drilled approximately 415 feet distance from the injection well, and perforations are similarly made in the same hydrocarbon-bearing formation at 6895–6915 feet.

The hydrocarbon-bearing formation in both the injection well and the production well is hydraulically fractured using conventional techniques, and a gravel-sand mixture is injected into the fracture to hold it open and prevent healing of the fracture.

In the next step, oil field brine of 1000 ppm hardness at a temperature of 75° F. containing dissolved therein 1.5% by weight petroleum sulfonate and 0.75% by weight of the product of Example I, is injected via the injection well into the formation at a pressure of about 1300 psig and at the rate of 1.05 barrels per minute. Injection of the driving fluid continues at the rate of 1.05 barrels per minute and at the end of 87 days a substantial production of petroleum is achieved.

What is claimed is:

1. A process for recovering petroleum from a subterranean petroleum-bearing formation penetrated by an injection well and a production well which comprises:
(A) injecting into the formation via the injection well a drive fluid comprising water having dissolved therein an effective amount of a surface active agent having the general formula:

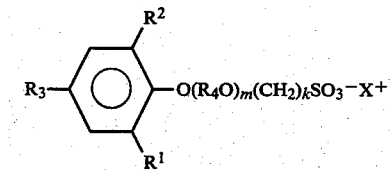

wherein
$R_1$ is t-butyl,
$R_2$ is hydrogen or $R_1$,
$R_3$ is an oligomer of propylene or butylene containing from 5 to 30 carbon atoms,
$R_4$ is an ethylene or 1,2-propylene radical,
m is an integer of from 2 to 20,
k is an integer of from 2 to 4 and
X is a sodium, potassium or ammonium cation;
(B) forcing the fluid through the formation and
(C) recovering petroleum through the production well.

2. The process of claim 1 wherein $R_3$ is dodecyl.
3. The process of claim 1 wherein $R_2$ is $R_1$.
4. The process of claim 1 wherein $R_3$ is an oligomer of propylene.
5. The process of claim 1 wherein $R_3$ is an oligomer of butylenes.
6. The process of claim 1 wherein k is an integer of 2 to 3.
7. The process of claim 1 wherein k is 2.
8. The process of claim 1 wherein X is a sodium cation.
9. The process of claim 1 wherein the fluid contains brine.
10. An aqueous fluid comprising:
(A) about 0.1 wt.% to about 5 wt.% of a surface active agent of the formula:

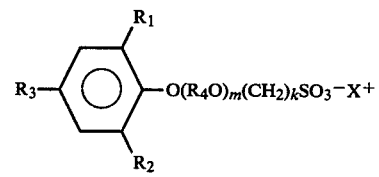

wherein
$R_1$ is t-butyl,
$R_2$ is hydrogen or $R_1$,
$R_3$ is an oligomer of propylene or butylene containing from 5 to 30 carbon atoms,
$R_4$ is an ethylene or 1,2-propylene radical,
m is an integer of from 2 to 20,
k is an integer of from 2 to 4 and
X is a sodium, potassium or ammonium cation; and
(B) about 0.5 wt.% to about 10 wt.% of a petroleum sulfonate.

11. The process of claim 10 wherein $R_3$ is dodecyl.
12. The fluid of claim 9 wherein $R_2$ is $R_1$.
13. The fluid of claim 9 wherein $R_3$ is an oligomer of propylene.
14. The fluid of claim 9 wherein $R_3$ is an oligomer of butylenes.
15. The fluid of claim 9 wherein k is an integer of 2 to 3.
16. The fluid of claim 9 wherein k is 2.
17. The fluid of claim 9 wherein X is a sodium cation.
18. The fluid of claim 9 wherein the petroleum sulfonate has a molecular weight of about 350 to about 500.

* * * * *